(12) United States Patent
Tewfik et al.

(10) Patent No.: US 6,915,481 B1
(45) Date of Patent: Jul. 5, 2005

(54) TRANSACTIONAL WATERMARKING

(75) Inventors: Ahmed Tewfik, Edina, MN (US); Mitchell D. Swanson, Minneapolis, MN (US); Bin Zhu, Edina, MN (US)

(73) Assignee: Cognicity, Inc., Edina, MN (US)

( * ) Notice: Subject to any disclaimer, the term of this patent is extended or adjusted under 35 U.S.C. 154(b) by 0 days.

(21) Appl. No.: 09/481,758

(22) Filed: Jan. 11, 2000

(51) Int. Cl.[7] .............................................. G06F 15/00
(52) U.S. Cl. ...................... 715/500.1; 380/201; 705/57; 705/6; 713/176
(58) Field of Search .......................... 713/176; 380/201, 380/200; 705/57, 6, 78, 26; 715/500.1

(56) References Cited

U.S. PATENT DOCUMENTS

| | | | |
|---|---|---|---|
| 5,319,735 A | 6/1994 | Preuss et al. ............... 395/2.14 |
| 5,636,292 A | 6/1997 | Rhoads ....................... 382/232 |
| 5,710,834 A | 1/1998 | Rhoads ....................... 382/232 |
| 5,721,788 A | 2/1998 | Powell et al. ............... 382/100 |
| 5,745,604 A | 4/1998 | Rhoads ....................... 382/232 |
| 5,748,763 A | 5/1998 | Rhoads ....................... 382/115 |
| 5,748,783 A | 5/1998 | Rhoads ....................... 382/232 |
| 5,765,152 A | 6/1998 | Erickson ........................ 707/9 |
| 5,768,426 A | 6/1998 | Rhoads ....................... 382/232 |
| 5,809,139 A | 9/1998 | Girod et al. ................... 380/5 |
| 5,809,160 A | 9/1998 | Powell et al. ............... 382/100 |
| 5,822,436 A | 10/1998 | Rhoads ....................... 380/54 |
| 5,832,119 A | 11/1998 | Rhoads ....................... 382/232 |
| 5,841,886 A | 11/1998 | Rhoads ....................... 382/115 |
| 5,841,978 A | 11/1998 | Rhoads ................... 395/200.47 |
| 5,850,481 A | 12/1998 | Rhoads ....................... 382/232 |
| 5,862,260 A | 1/1999 | Rhoads ....................... 382/232 |
| 5,930,369 A * | 7/1999 | Cox et al. ..................... 380/54 |
| 5,930,377 A | 7/1999 | Powell et al. ............... 382/100 |
| 5,959,945 A | 9/1999 | Kleiman ....................... 381/81 |
| 6,005,935 A | 12/1999 | Civanlar ....................... 705/51 |
| 6,026,193 A | 2/2000 | Rhoads ....................... 382/232 |
| 6,233,347 B1 | 5/2001 | Chen et al. ................... 382/100 |
| 6,278,792 B1 * | 8/2001 | Cox et al. ..................... 382/100 |
| 6,285,774 B1 | 9/2001 | Schumann et al. ......... 382/100 |
| 6,389,403 B1 | 5/2002 | Dorak, Jr. et al. ............ 705/52 |
| 6,425,081 B1 | 7/2002 | Iwamura ...................... 713/176 |
| 6,513,118 B1 * | 1/2003 | Iwamura ...................... 713/176 |
| 6,564,225 B1 * | 5/2003 | Brogliatti et al. ......... 707/104.1 |
| 6,598,162 B1 | 7/2003 | Moskowitz ................. 713/176 |
| 6,636,615 B1 * | 10/2003 | Rhoads et al. .............. 382/100 |
| 6,643,696 B2 | 11/2003 | Davis et al. ................. 709/224 |
| 6,668,246 B1 * | 12/2003 | Yeung et al. ................. 705/57 |
| 2001/0012377 A1 | 8/2001 | Rhoads ....................... 382/100 |

OTHER PUBLICATIONS

Haitsma, Jaap, 'Audio Watermarking for Monitoring and Copy Protection', Copyright Jan. 11, 2000, ACM Multimedia Workshop, pp. 119–122.*

Secure Hash Standard, Federal Information Processing Standards Publication, U.S. Department of Commerce, Technology Administration, National Institute of Standards and Technology, (Apr., 1995).

(Continued)

Primary Examiner—Joseph Feild
Assistant Examiner—Matthew Ludwig
(74) Attorney, Agent, or Firm—Schwegman Lundberg Woessner & Kluth P.A.

(57) ABSTRACT

Transactional watermarking is disclosed. In one embodiment, a computer-implemented method includes receiving an original multimedia content source. The original multimedia content source may have already had a watermark added thereto. The method watermarks at least a portion of the source at least two times, each time with a different watermark to generate a different watermarked version of the original multimedia content source. A final watermarked content source is then generated by utilizing the different watermarked versions of the content source. One particular version of the watermarked content source may be selected as the final watermarked content source; at least a portion of at least two of the different watermarked versions of the watermarked content source may be combined to generate the final watermarked content source; etc.

19 Claims, 5 Drawing Sheets

OTHER PUBLICATIONS

Goldwasser, S., et al., "Lecture Notes on Cryptography", http://www-cse.ucsd.edu/users/mihir/papers/crypto-papers.html,(Jul., 1996).

Lin, S., et al., *Error Control Coding: Fundamentals and Applications*, Prentice Hall, Inc., Englewood Cliffs, N.J., ISBN 0-13-283796-X,(1983), Table of Contents.

Quatieri, T. F., et al., "Speech Transformations Based on a Sinusoidal Representation", *IEEE Transactions on Acoustics, Speech, and Signal Processing*, (Dec., 1986), pp. 1449-1464.

Rivest, R. L., "Cryptography", *Handbook of Theoretical Computer Sciences, A (3)*, Van Leeuwen, J., (ed.),(1990), pp. 717-755.

Rivest, R. L., "The MD4 MEssage Digest Algorithm", *Advances in Cryptology—CRYPTO '90*, (1991), pp. 303-311.

Thompson, D. J., "Spectrum Estimation and Harmonic Analysis", *Proceeding's of the IEEE, 70(9)*, (Sep., 1982), pp. 1055-1096.

\* cited by examiner

TRANSACTIONAL WATERMARKING

FIELD OF THE INVENTION

This invention relates generally to digital watermarking of multimedia data, and more particularly to transactional digital watermarking of multimedia data.

BACKGROUND OF THE INVENTION

With the increasing popularity of multimedia-capable computers, and the digitalization of multimedia in general, the importance of multimedia data embedding has become more important. In one type of multimedia data embedding, a key, also known as a watermark, is embedded into multimedia data, a process which is known as watermarking. This allows questions of ownership of a given piece of multimedia data—which may be widely distributed by virtue of the Internet, for example—to be resolved, by attempting to decode the key from the multimedia data. That is, by watermarking multimedia data, the data owner can determine whether a suspect piece of the multimedia data is his or hers by determining whether the watermark is present in the suspect data.

For example, a record company, prior to making its music selections available on the Internet for widespread purchase and use, can first watermark the data representing a music selection. If a site on the Internet is providing bootleg copies of the music selections, but claims that the copies are not in fact owned by the record company, the company can prove that they are indeed owned by it by showing that the watermark is present in the bootleg copies. Therefore, watermarking has applicability to audio multimedia, as well as other types of multimedia, such as image and video multimedia.

While conventional watermarking provides the advantage of being able to identify ownership of multimedia content, it is unable to identify who originally made a bootleg copy of the multimedia content. Thus, there is a need in the art for a mechanism to watermark a multimedia source for each transaction that affects the source. The watermarking must occur in such a manner as to identify the party participating in the transaction related to the multimedia source, for example, a purchaser of the multimedia source. Identifying parties related to the transaction is needed, because it provides a means for identifying a party who allows unauthorized copies to be made. Furthermore, there is a need in the art for means to indicate whether a given copy of a multimedia content source is registered or not registered, or to indicate the copying rights permitted of the user (for example, unlimited copying, one copy only, or no copying allowed).

However, prior art schemes of watermarking are ill suited to providing watermarks for the above-described transactions. Because watermarking in general is computationally intensive, a server responsible for transferring copies of a multimedia content source, and adding a watermark for every copy transferred, may become overwhelmed, necessitating the addition of more costly computing power. Furthermore, because the content source is typically compressed when stored on the server, it may be necessary to first decompress the source to add the watermark, which can also require additional computing power. For these and other reasons, there is a need for the present invention.

SUMMARY OF THE INVENTION

The invention relates to transactional watermarking. In one embodiment, a computer-implemented method includes receiving an original multimedia content source. In one specific embodiment, this original multimedia content source may have already had a watermark added thereto. Next, the method watermarks at least a portion of the source at least two times, each time with a different watermark to generate a different watermarked version of the original multimedia content source. Finally, a final watermarked content source is generated by utilizing the different watermarked versions of the content source. For example, one particular version of the watermarked content source may be selected as the final watermarked content source; in another embodiment, at least a portion of at least two of the different watermarked versions of the watermarked content source are combined to generate the final watermarked content source.

Thus, embodiments of the invention provide for advantages over the prior art. The watermarking of the original multimedia content source at least two times, to generate different watermarked versions of the content source, can be done prior to storing the versions on a server. When the server is requested to provide a copy of the multimedia content source, rather than adding a transactional watermark after the request has been made, it instead only has to combine portions of one watermarked version of the content source with another watermarked version of the content source—for example, based on the request itself—to generate a unique transactionally watermarked version of the content source. This process of combining is generally not as computationally intensive as having the server add a watermark itself. Therefore, server response is improved, and additional computational resources may not be required.

Other aspects, embodiments and advantages of the present invention will become apparent by reading the following detailed description, and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The embodiments of the invention described herein can be implemented within computers, as known in the art, within systems, within methods, etc.; the invention itself is not so limited. For example, methods can be realized at least in part as one or more programs running on a computer—that is, as a program executed from a machine-readable medium such as a memory by a processor of a computer. The programs are desirably storable on a machine-readable medium such as a floppy disk or a CD-ROM, for distribution and installation and execution on another computer, for example, over the Internet.

Figure 1:
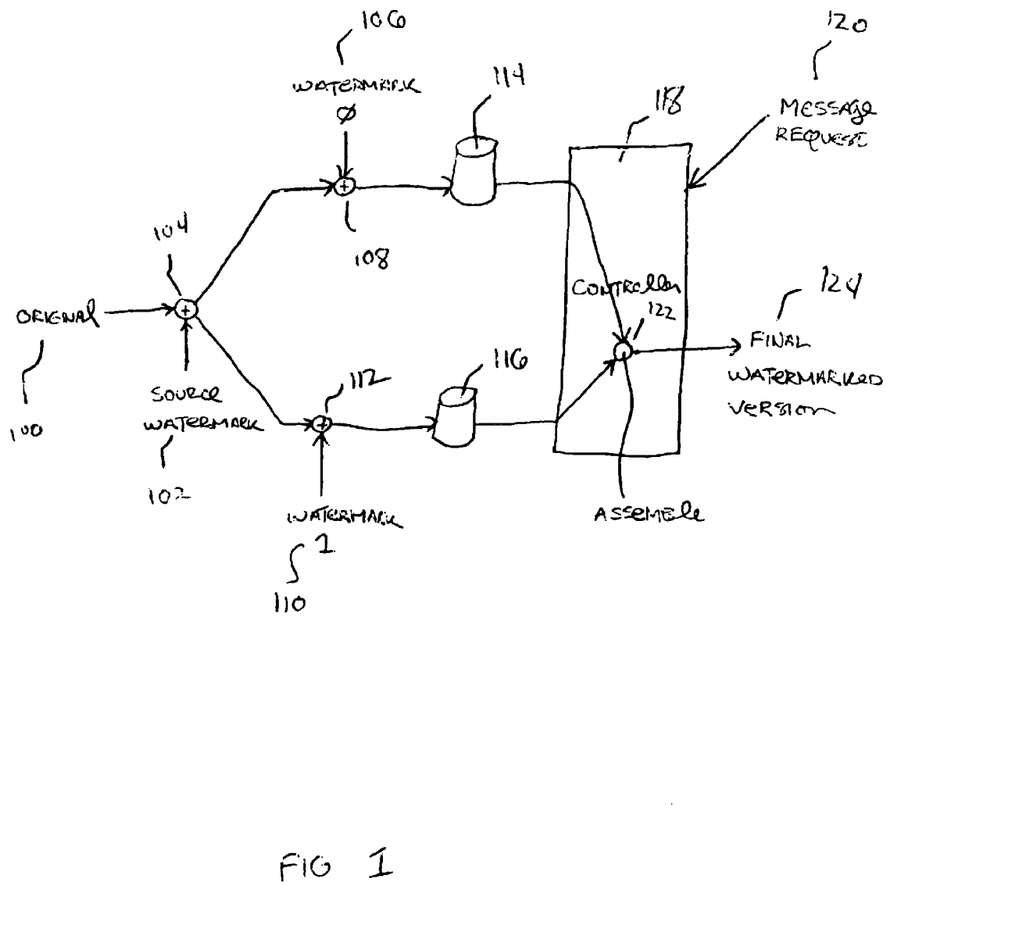
FIG. 1 shows a diagram according to an embodiment of the invention.

Referring first to FIG. 1, a diagram of one embodiment of the invention is shown. Generally, the embodiment of FIG. 1 illustrates the creation of a unique transactional watermarked version of a multimedia content source by combining portions of differently watermarked versions of the source in response to a request to obtain the source. Thus, desirably no watermarking is actually performed after a message requesting the content source has been received; rather, all watermarking is desirably performed a priori, such that only combination of differently watermarked versions of the source is needed to generate the unique transactional watermarked version of the multimedia content source desired.

A non-watermarked version of an original multimedia content source 100 is first received. The source 100 may represent multimedia data such as audio data, video data, or image data; the invention itself is not so limited. The non-watermarked version of the original multimedia content source 100 is then watermarked with a source watermark 102, to generate a source watermarked version of the original multimedia content source, as represented by 104 in FIG. 1. The source watermarked version thus desirably indicates the owner, creator, or source, of the original multimedia content source. The invention is not limited by the manner in which the watermarking represented by 104 in FIG. 1 is performed; in one embodiment, the watermarking is performed in accordance with the description given in the coassigned and copending U.S. patent application Ser. No. 09/228,224 entitled "MULTIMEDIA DATA EMBEDDING," filed Jan. 11, 1999, which is hereby incorporated by reference.

Furthermore, it is noted that source watermarking as represented by 104 of the non-watermarked version of the original multimedia content source is not required by the invention. Therefore, to preserve generality of discussion, hereafter the original multimedia content source is referred to as the original multimedia content source to encompass both a source watermarked version thereof and a non-source watermarked version thereof. That is, reference to the original multimedia content source indicates that the original multimedia content source can either have been source watermarked, or may have not been source watermarked.

Next, the at least a portion of the original multimedia content source is watermarked at least two times, each time with a different watermark to generate a different watermarked version of the original multimedia content source. For example, as shown in FIG. 1, the original multimedia content source is watermarked with a binary-zero watermark 106, as represented by 108, to produce a binary-zero watermarked version of the content source that may be saved to a storage 114 (e.g., a hard disk drive, a removable media drive, a memory, etc.), and also by a binary-one watermark 110, as represented by 112, to produce a binary-one watermarked version of the content source that may be saved to a storage 116 (which can be the same or different storage as the storage 114).

The binary-zero watermark 106 is a watermark that a priori is meant to represent a first watermark, that for the purposes of description is meant to represent a binary zero. The watermark itself may not actually be a string of binary zeroes. Likewise, the binary-one watermark 108 is a watermark that a priori is meant to represent a second watermark, that for the purposes of description is meant to represent a binary one. The watermark itself may not actually be a string of binary ones. The watermarking process for either watermark may be performed in accordance with any desired watermarking scheme, such as that which has been described and incorporated by reference.

The controller 118 (which in one embodiment may be a server computer), thus is able to generate a transactional watermarked version of the original multimedia source without actually performing the computations of watermarking, as is done in the prior art. For example, the controller 118 may receive a request for the original multimedia content source, where the request includes a message specific to the request, as indicated by 120 in FIG. 1. This request may be received from over the Internet, for example. In response, the controller 118 combines at least a portion of the binary-zero watermarked version of the source as stored on the storage 114 with at least a portion of the binary-one watermarked version of the source as stored on the storage 116, as represented by 122 in FIG. 1.

In one embodiment, this combination process involves an original multimedia content source that is divided into separate blocks. For a given block, the controller 118 utilizes either a corresponding block of the binary-zero watermarked version of the source or the binary-one watermarked version of the source. Thus, rather than computationally adding a transactional watermark to the source, the controller 118 instead assembles a transactionally watermarked version of the original multimedia source from the binary-zero watermarked version and the binary-one watermarked version of the source.

To determine whether for a given block either a corresponding block of the binary-zero watermarked version or a corresponding block of the binary-one watermarked version should be used, the controller 118 in one embodiment bases this decision on the message specific to the request as represented by 120 in FIG. 1. Insofar as the messages are specific to the request (for example, a message may include information such as the requestor's e-mail address, location, time of day, date, etc.; the invention is not so limited), the resulting final watermarked version of the original multimedia content source 124 that is sent back to the requestor in response to the request is a uniquely transactionally watermarked version of the original content media source. In other words, the final watermarked version 124 of the original multimedia content source is a transactionally watermarked version of the source, in one embodiment specific to the message accompanying the request represented by 120—without the controller 118 having to actually perform the computations necessary to add the watermark as is done in the prior art.

Figure 2:
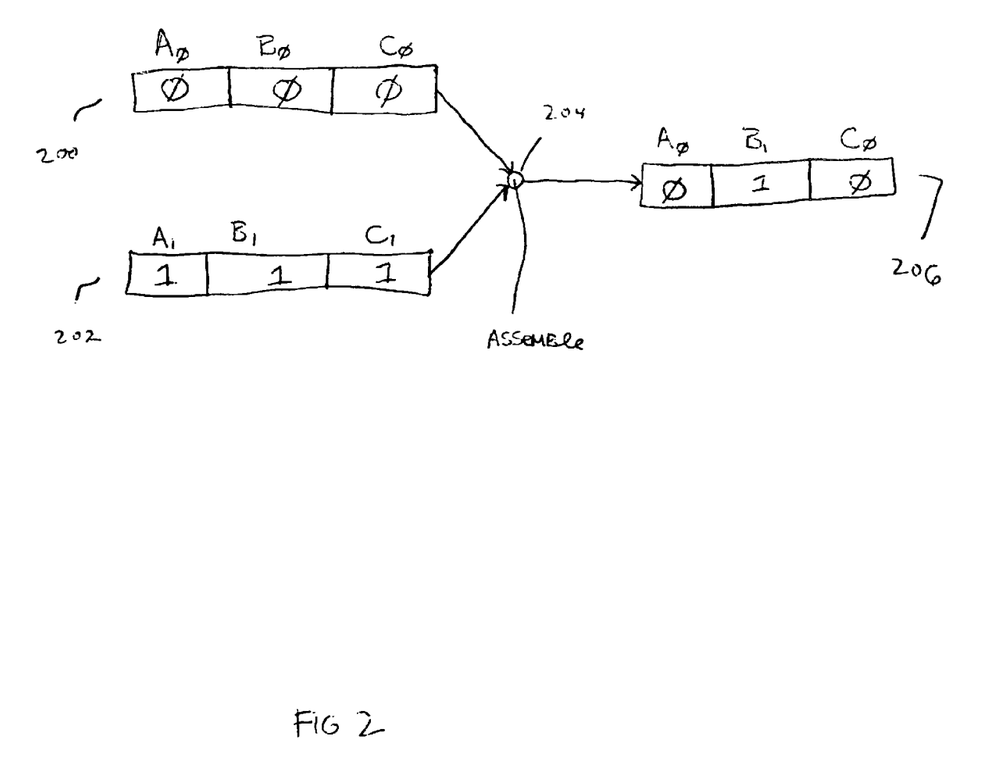
FIG. 2 shows in more detail the combination process performed in the diagram of FIG. 1.

This is shown in more detail in FIG. 2. A binary-zero watermarked version 200 of the original multimedia content source includes three blocks A0, B0 and C0, and a binary-one watermarked version 202 of the original multimedia content source includes three blocks A1, B1 and C1. In response to receiving a request for the multimedia content source, the controller assembles these two versions 200 and 202, as represented by 204, to generate a final watermarked version 206 of the original multimedia content source. The final watermarked version 206 also includes three blocks, which in FIG. 2 is shown by way of example a case where the first block and the third block originate from the binary-zero watermarked version 200, and the second block originates from the binary one watermarked version 202. Thus, the controller is not performing computations per se to generate the final watermarked version 206, but rather is assembling a final watermarked version 206 from previously computed watermarked versions 200 and 202, by combining some blocks from the version 200 with some other blocks of the version 202.

Figure 3:
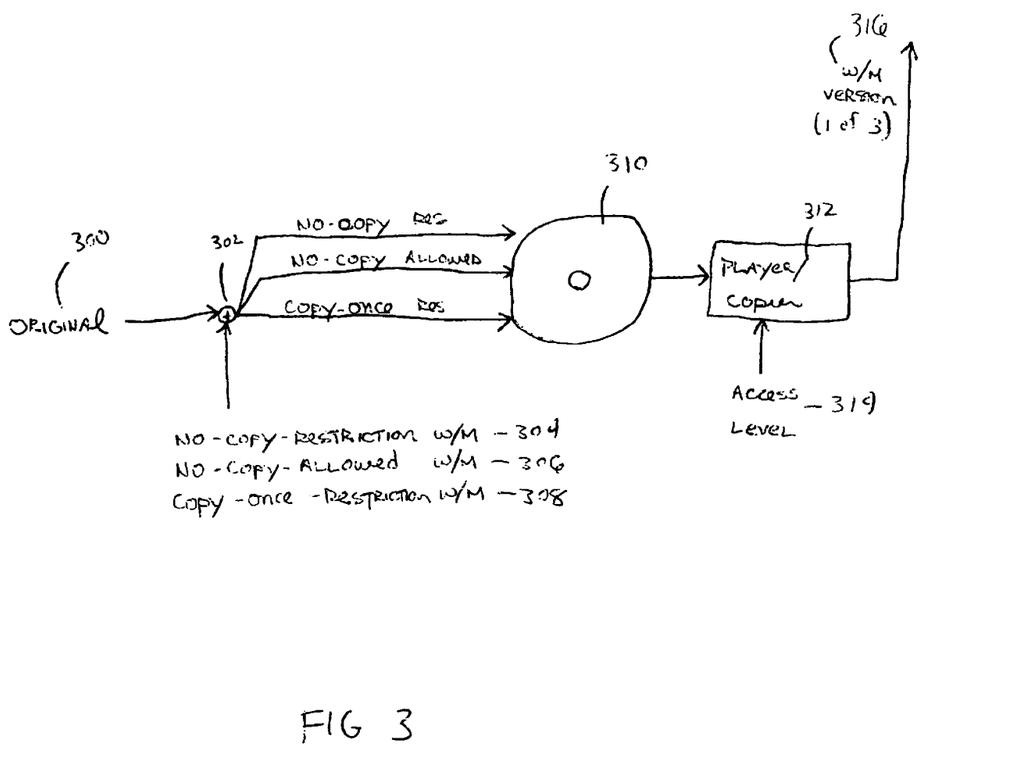
FIG. 3 shows a diagram according to another embodiment of the invention.

Referring next to FIG. 3, a diagram of another embodiment of the invention is shown. Generally, the embodiment of FIG. 3 illustrates the creation of different watermarked versions of a original multimedia content source, where the final watermarked version thereof generated (sent) is selected as one of these different versions, for example, depending on some sort of predetermined criteria. Thus, different watermarked versions of the original multimedia content source can be generated as the final (transactionally) watermarked version at different times, without a controller, server or device having to actually perform the different watermarking to produce a different watermarked version desired.

As shown in FIG. 3, the original multimedia content source 300, which may or may not already have a source watermark thereon, is watermarked three times, as represented by 302. In particular, it is first watermarked with a watermark 304 representing a "no-copy-restriction" access level to the original multimedia content source (e.g., such that the user has no restrictions in making copies of the source), to generate a no-copy-restriction watermarked version of the original multimedia content source. Next, it is watermarked with a watermark 306 representing a "no-copy-allowed" access level to the original source (e.g., such that the user is not able to make a copy of the source), to generate a no-copy-allowed watermarked version of the original multimedia content source. Finally, it is watermarked with a watermark 308 representing a "copy-once-restriction" access level to the original source (e.g., such that the user is able to make one copy of the source), to generate a copy-once-restriction watermarked version of the original multimedia content source.

All three of these watermarked versions of the original multimedia content source are then saved to a storage 310, such as a CD-ROM, or DVD. When the storage 310 is placed in a player or copier device 312 (for example, a CD-ROM player, or a DVD player), the device 312 selects one of the three watermarked versions as the final watermarked version 316 to be generated (that is, as the transactionally watermarked version of the original multimedia content source), based on an access level 314 of the user or owner of the device 312. For example, a low-access end user may only be permitted to use the no-copy-allowed version of the original multimedia source. This means if such an end user attempts to digitally record this no-copy-allowed version on another device (such as another device 312) that is programmed to respect this access level, the device will not permit the user to record the original multimedia source.

As a further example, a normal-access end user may be permitted to use the copy-once-restriction version of the original multimedia source. This means the end user can digitally record this version on another device—but thereafter no copies of this copy can be made on devices that respect the access level (limiting copies of the multimedia source to those made from the versions stored on the storage 310, and not from any copies made from the versions stored on the storage 310). Finally, a high-access end user may be permitted to use the no-copy-restriction version of the source, such that any number of copies of this copy (and copies of copies of copies, etc.) can be made. Thus, the watermarked versions are used to control copying privileges of the original source material, depending on an access level of the user or owner of the original source. Those of ordinary skill within the art can appreciate that other access levels in addition to or in lieu of those described herein can also be made and still fall within the scope of the invention.

Figure 4:
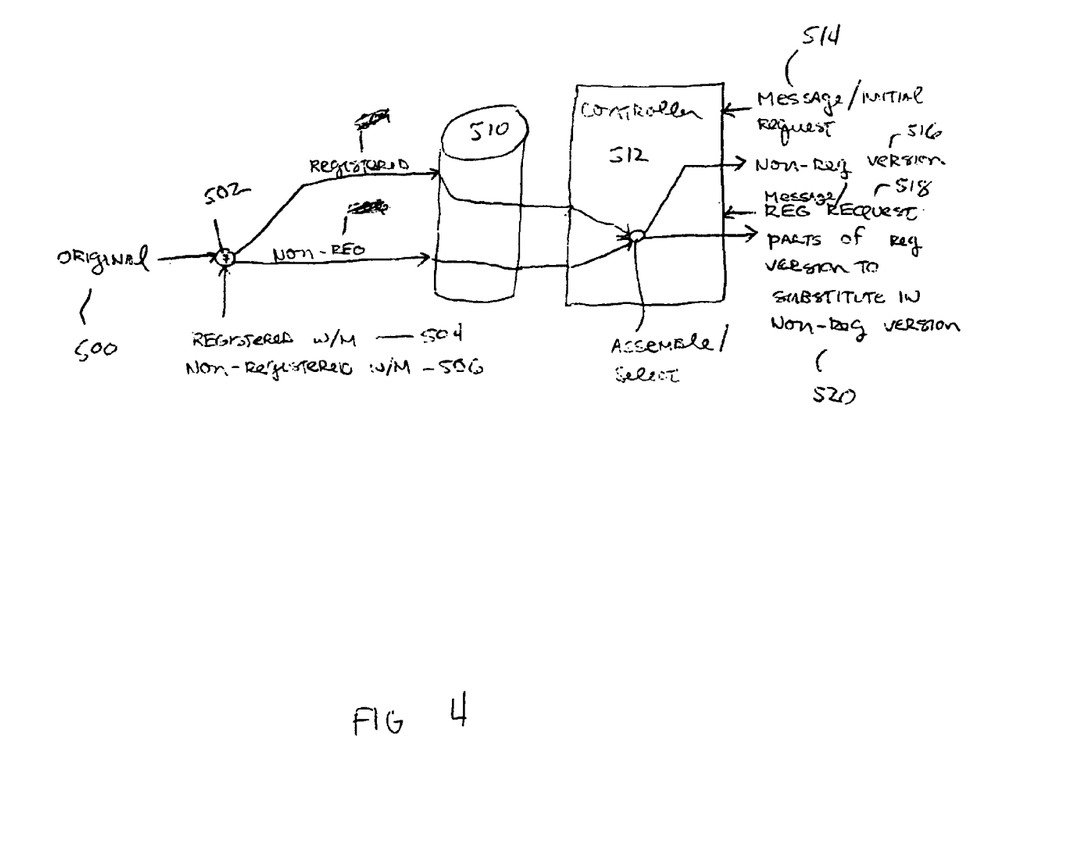
FIG. 4 shows a diagram according to still another embodiment of the invention; and, FIG. 5 shows a diagram of a computer in conjunction with which embodiments of the invention may be practiced.

Still another embodiment of the invention is shown in FIG. 4. Generally, the embodiment of FIG. 4 illustrates substituting at least a portion of a final watermarked content source with a corresponding portion of one or more different watermarked versions of the content source. Thus, changing the status of a final watermarked content source can be accomplished not by re-watermarking the content source, nor by resending a completely different watermarked version of the content source, but rather by only sending one or more portions of another differently watermarked version or versions of the content source for substitution with corresponding portions of the current final watermarked content source. For example, a final watermarked content source having over 10,000 blocks could have its status changed by substituting less than 10% of these blocks with blocks from other watermarked versions of the content source, instead of having to resend a completely new watermarked version of the content source, which can take longer in transmission time.

As shown in FIG. 4, the original multimedia content source 500, which may or may not already have a source watermark thereon, is watermarked two times, as represented by 502. In particular, it is first watermarked with a watermark 504 representing a "registered" access level to the original multimedia content source (e.g., indicating that the multimedia content source is registered to a user), to generate a in registered watermarked version of the original multimedia content source. Next, it is watermarked with a watermark 506 representing a "not registered" access level to the original source (e.g., indicating that the multimedia content source is not registered), to generate a not-registered watermarked version of the original multimedia content source.

Both of these watermarked versions of the original multimedia content source are then saved to a storage 510, such as a hard disk drive, etc. The controller 512, which may be a server computer, etc., thus is able to receive a request for the original multimedia content source, as represented by 514, for example, over the Internet. In response, the controller 512 first selects the non-registered watermark version of the original multimedia source to send to the requester, as represented by 516. Later, the requestor may desire to register his or her copy of the original multimedia source, sending another request, as represented by 518. This time, the controller 512 only sends parts or portions of the registered watermark version of the original multimedia source, as represented by 520. The requestor then substitutes these parts or portions for corresponding parts or portions of his or her current (non-registered watermark) version of the original multimedia source.

Thus, the embodiment of FIG. 4 first generates a final watermarked version of the original multimedia source that is the non-registered watermark version thereof. When a user desires to register this version, rather than resending the complete registered watermark version, the controller 512 instead only sends parts or portions of the registered watermark version, so that the user can switch them into corresponding parts or portions of the non-registered watermark version. In this manner, a new final watermarked version of the original multimedia source is created, without the controller having to resend an entire registered watermark version. The parts or portions of the registered watermark version to be switched into the non-registered watermark version can in one embodiment be based on a message sent accompanying the request that is specific to the requestor (user)—e.g., specifying the user's name, location, e-mail address, etc. This may be accomplished as has been already described in conjunction with FIG. 2 above.

Figure 5:
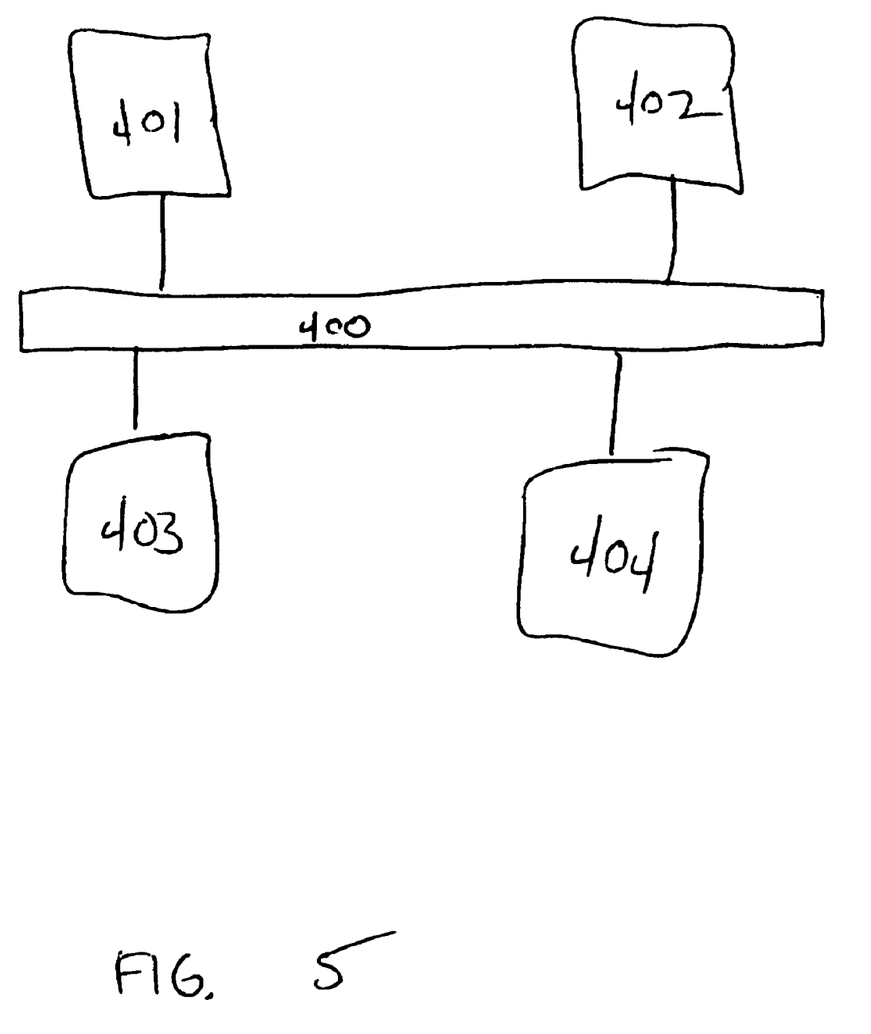

Referring finally to FIG. 5, a diagram of a computer in conjunction with which embodiments of the invention may be practiced is shown. The computer comprises bus 400, keyboard interface 401, external memory 402, mass storage device 403 and processor 404. Bus 400 can be a single bus or a combination of multiple buses. Bus 400 can also comprise combinations of any buses. Bus 400 provides communication links between components in the computer. Keyboard controller 401 can be a dedicated device or can reside in another device such as a bus controller or other controller. Keyboard controller 401 allows coupling of a keyboard to the computer system and transmits signals from a keyboard to the computer system. External memory 402 can comprise a dynamic random access memory (DRAM) device, a static random access memory (SRAM) device, or other memory devices. External memory 402 stores information from mass storage device 403 and processor 404 for use by processor 404. Mass storage device 403 can be a hard disk drive, a floppy disk drive, a CD-ROM device, or a flash memory device. Mass storage device 404 provides information to external memory 402. Processor 404 can be a microprocessor and is capable of decoding and executing a computer program such as an application program or operating system with instructions from multiple instruction sets.

Transactional watermarking has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method for transactional watermarking comprising:

receiving an original multimedia content source;

watermarking at least a portion of the original multimedia content source at least two times, each time with a different watermark to generate a different watermarked version of the original multimedia content source, wherein said watermarking includes watermarking at least a portion of the original multimedia content source a first time with a not-registered watermark to generate a not-registered watermarked version of the original multimedia content source and watermarking at least a portion of the original multimedia content source a second time with a registered watermark to generate a registered watermarked version of the original multimedia content source;

generating a final watermarked content source by utilizing the different watermarked versions of the original multimedia content source; and generating a new final watermarked content source by substituting at least a portion of the final watermarked content source with a corresponding at least a portion of at least one of the different watermarked versions of the original multimedia content source.

2. The method of claim 1, wherein generating a final watermarked content source comprises selecting one of the different watermarked versions of the original multimedia content source as the final watermarked content source.

3. The method of claim 1, further comprising:

receiving a request for the original multimedia content source; and, in response to receiving the request, sending the final watermarked content source.

4. The method of claim 3, further comprising:

receiving a request to register the original multimedia content source with a user; and, in response to receiving the request, sending the new final watermarked content source.

5. The method of claim 4, wherein watermarking at least a portion of the original multimedia content source a second time with a registered watermark to generate a registered watermarked version of the original multimedia content source comprises utilizing a registered watermark specific to the user.

6. The method of claim 1, wherein generating a final watermarked content source comprises selecting the not-registered watermarked version of the original multimedia content source as the final watermarked content source.

7. The method of claim 6, wherein generating a new final watermarked content source comprises substituting at least a portion of the not-registered watermarked version of the original multimedia content source with a corresponding at least a portion of the registered watermarked version of the original multimedia content source.

8. A computer-implemented method for transactional watermarking comprising:

receiving an original multimedia content source;

watermarking at least a portion of the original multimedia content source at least two times, each time with a different watermark to generate a different watermarked version of the original multimedia content source, wherein said watermarking includes watermarking at least a portion of the original multimedia content source a first time with a no-copy-restriction watermark to generate a no-copy-restriction watermarked version of the original multimedia content source and watermarking at least a portion of the original multimedia content source a second time with a no-copy-allowed watermark to generate a no-copy-allowed watermarked version of the original multimedia content source; and generating a final watermarked content source including selecting one of the different watermarked versions of the original multimedia content source as the final watermarked content source.

9. The method of claim 8, wherein watermarking at least a portion of the original multimedia content source at least two times further comprises watermarking at least a portion of the original multimedia content source a third time with a copy-once-restriction watermark to generate a copy-once-restriction watermarked version of the original multimedia content source.

10. The method of claim 9, wherein selecting one of the different watermarked versions of the original multimedia content source as the final watermarked content source comprises selecting one of the no-copy-restriction watermarked version, the no-copy-allowed watermarked version, and the copy-once-restrict watermarked version as the final watermarked content source based on a predetermined access level.

11. The method of claim 8, further comprising:

receiving a request for the original multimedia content source, the request including a message specific to the request; and, in response to receiving the request, sending the final watermarked content source.

12. The method of claim 11, wherein generating a final watermarked content source comprises combining at least a portion of at least two of the different watermarked versions of the original multimedia content source based on the message specific to the request.

13. The method of claim 11, wherein generating a final watermarked content source comprises selecting one of the different watermarked versions of the original multimedia content source as the final watermarked content source.

14. A computer-implemented method for transactional watermarking comprising:

receiving an original multimedia content source;

watermarking at least a portion of the original multimedia content source at least two times, each time with a different watermark to generate a different watermarked version of the original multimedia content source, wherein said watermarking includes watermarking at least a portion of the original multimedia content source a first time with a binary-zero watermark to generate a binary-zero watermarked version of the original multimedia content source and watermarking at least a portion of the original multimedia content source a second time with a binary-one watermark to generate a binary-one watermarked version of the original multimedia content source; and generating a final watermarked content source including combining at least a portion of at least two of the different watermarked versions of the original multimedia content source.

15. The method of claim 14, wherein combining at least a portion of at least two of the different watermarked versions of the original multimedia content source comprises combining at least a portion of the binary-zero watermarked version with at least a portion of the binary-one watermarked version.

16. The method of claim 14, initially comprising:

receiving a non-watermarked version of the original multimedia content source; and, watermarking the non-watermarked version of the original multimedia content source with a source watermark to generate the original multimedia content source.

17. The method of claim 14, further comprising:

receiving a request for the original multimedia content source, the request including a message specific to the request; and, in response to receiving the request, sending the final watermarked content source.

18. The method of claim 17, wherein generating a final watermarked content source comprises combining at least a portion of at least two of the different watermarked versions of the original multimedia content source based on the message specific to the request.

19. The method of claim 17, wherein generating a final watermarked content source comprises selecting one of the different watermarked versions of the original multimedia content source as the final watermarked content source.

* * * * *